US011098493B2

(12) United States Patent
MacKarvich

(10) Patent No.: US 11,098,493 B2
(45) Date of Patent: Aug. 24, 2021

(54) COMPRESSION POST WITH RETAINER CLIP

(71) Applicant: Charles J. MacKarvich, Atlanta, GA (US)

(72) Inventor: Charles J. MacKarvich, Atlanta, GA (US)

(*) Notice: Subject to any disclaimer, the term of this patent is extended or adjusted under 35 U.S.C. 154(b) by 0 days.

(21) Appl. No.: 17/016,586

(22) Filed: Sep. 10, 2020

(65) Prior Publication Data

US 2021/0010284 A1     Jan. 14, 2021

Related U.S. Application Data

(63) Continuation-in-part of application No. 16/510,499, filed on Jul. 12, 2019.

(51) Int. Cl.
*E04G 25/06* (2006.01)
*F16B 2/12* (2006.01)

(52) U.S. Cl.
CPC .............. *E04G 25/065* (2013.01); *F16B 2/12* (2013.01)

(58) Field of Classification Search
CPC ........ E04G 25/065; E04G 25/061; F16B 2/12
USPC .... 248/542, 161, 404, 405, 406.1, 407, 408, 248/410, 423, 351, 354.1, 354.3, 354.4, 248/354.5, 354.6, 200.1, 221.11, 222.13, 248/223.31, 223.41, 224.8, 225.11, 125.8, 248/188.5, 326, 333
See application file for complete search history.

(56) References Cited

U.S. PATENT DOCUMENTS

| | | | | |
|---|---|---|---|---|
| 1,350,349 | A * | 8/1920 | Walther | E04F 15/20 52/402 |
| 2,090,550 | A * | 8/1937 | Pilblad | H04R 1/08 248/410 |
| 2,192,079 | A * | 2/1940 | Hinselmann | E21D 15/285 254/116 |
| 3,734,441 | A * | 5/1973 | Lux | F16B 2/246 248/354.1 |
| 3,734,467 | A * | 5/1973 | Weeden | E04H 17/163 256/65.04 |
| 3,856,421 | A * | 12/1974 | Nogler | E04G 25/065 403/118 |

(Continued)

OTHER PUBLICATIONS

MacKarvich, Charles J.; Non-Final Office Action for U.S. Appl. No. 16/510,499, filed Jul. 12, 2019, dated Dec. 22, 2020, 14 pgs.

(Continued)

*Primary Examiner* — Eret C McNichols
*Assistant Examiner* — Michael McDuffie
(74) *Attorney, Agent, or Firm* — Taylor English Duma LLP

(57) ABSTRACT

Example aspects of a retainer clip for a compression post, a compression post for a building, and a method of adjusting a length of a compression post are disclosed. The retainer clip can comprise a retainer body defining a first lateral body end, a second lateral body end opposite the first lateral end, a retainer opening formed through the retainer body and positioned between the first and second lateral body ends, and a retainer tab extending into the retainer opening; a biasing element positioner extending from the second lateral body end, the biasing element positioner comprising a positioner end wall, the positioner end wall defining an inner surface; and a biasing element engaging the inner surface of the biasing element positioner.

19 Claims, 8 Drawing Sheets

(56) References Cited

U.S. PATENT DOCUMENTS

| | | | | |
|---|---|---|---|---|
| 4,733,844 A | * | 3/1988 | Molloy | E04F 21/1805 |
| | | | | 248/354.1 |
| 4,899,452 A | | 2/1990 | Schafer | |
| 4,928,916 A | * | 5/1990 | Molloy | E04F 21/1805 |
| | | | | 248/354.1 |
| 5,186,429 A | * | 2/1993 | Linnepe | B60S 9/04 |
| | | | | 248/354.1 |
| 5,317,813 A | | 6/1994 | Reed | |
| 5,651,535 A | * | 7/1997 | David | F16F 1/3732 |
| | | | | 267/140.5 |
| 5,913,783 A | * | 6/1999 | Weener | A47B 96/1425 |
| | | | | 248/354.1 |
| 6,152,434 A | * | 11/2000 | Gluck | E04F 21/1805 |
| | | | | 254/114 |
| 6,247,882 B1 | * | 6/2001 | Huang | B60P 7/15 |
| | | | | 410/143 |
| 6,254,161 B1 | * | 7/2001 | Wochaski | B62D 25/163 |
| | | | | 248/225.11 |
| 6,267,347 B1 | * | 7/2001 | Ryan | F16F 1/3732 |
| | | | | 248/562 |
| 6,347,777 B1 | * | 2/2002 | Webber | A47C 7/402 |
| | | | | 248/188.5 |
| 7,086,631 B2 | * | 8/2006 | Lee | F16M 11/26 |
| | | | | 248/161 |
| 7,290,742 B2 | * | 11/2007 | Wang | A45B 7/005 |
| | | | | 135/16 |
| 7,510,152 B2 | | 3/2009 | Melic | |
| 7,895,803 B2 | * | 3/2011 | Downey | E04B 1/82 |
| | | | | 52/511 |
| 8,002,229 B2 | * | 8/2011 | Hewson | E04G 21/3233 |
| | | | | 248/410 |
| 8,146,876 B1 | * | 4/2012 | Young | F16M 11/28 |
| | | | | 248/412 |
| 8,152,118 B2 | | 4/2012 | Melic | |
| 8,490,930 B2 | * | 7/2013 | Huang | B60P 7/15 |
| | | | | 248/125.2 |
| 8,496,217 B2 | * | 7/2013 | Cerezo Lotina | B60P 7/15 |
| | | | | 248/354.1 |
| 8,806,952 B1 | | 8/2014 | Glass | |
| 9,663,962 B1 | | 5/2017 | Whittemore | |
| 10,774,552 B2 | * | 9/2020 | Klein | E04F 21/1833 |
| 10,844,607 B2 | * | 11/2020 | Potter | E04F 13/0805 |
| 2010/0140436 A1 | * | 6/2010 | Wu | A47C 7/54 |
| | | | | 248/354.4 |
| 2010/0141464 A1 | | 6/2010 | Robertson, Jr. | |
| 2010/0308196 A1 | * | 12/2010 | Lee | D06F 53/04 |
| | | | | 248/353 |
| 2011/0097180 A1 | | 4/2011 | Bastone | |
| 2012/0096938 A1 | | 4/2012 | Edwards | |
| 2016/0069367 A1 | * | 3/2016 | Christensen | F16M 11/32 |
| | | | | 248/188.5 |
| 2021/0010283 A1 | | 1/2021 | MacKarvich | |

OTHER PUBLICATIONS

Mackarvich, Charles J.; Final Office Action for U.S. Appl. No. 16/510,499, filed Jul. 12, 2019, dated Apr. 20, 2021, 17 pgs.

Mackarvich, Charles J.; Notice of Allowance for U.S. Appl. No. 16/510,499, filed Jul. 12, 2019, dated Jun. 22, 2021, 9 pgs.

* cited by examiner

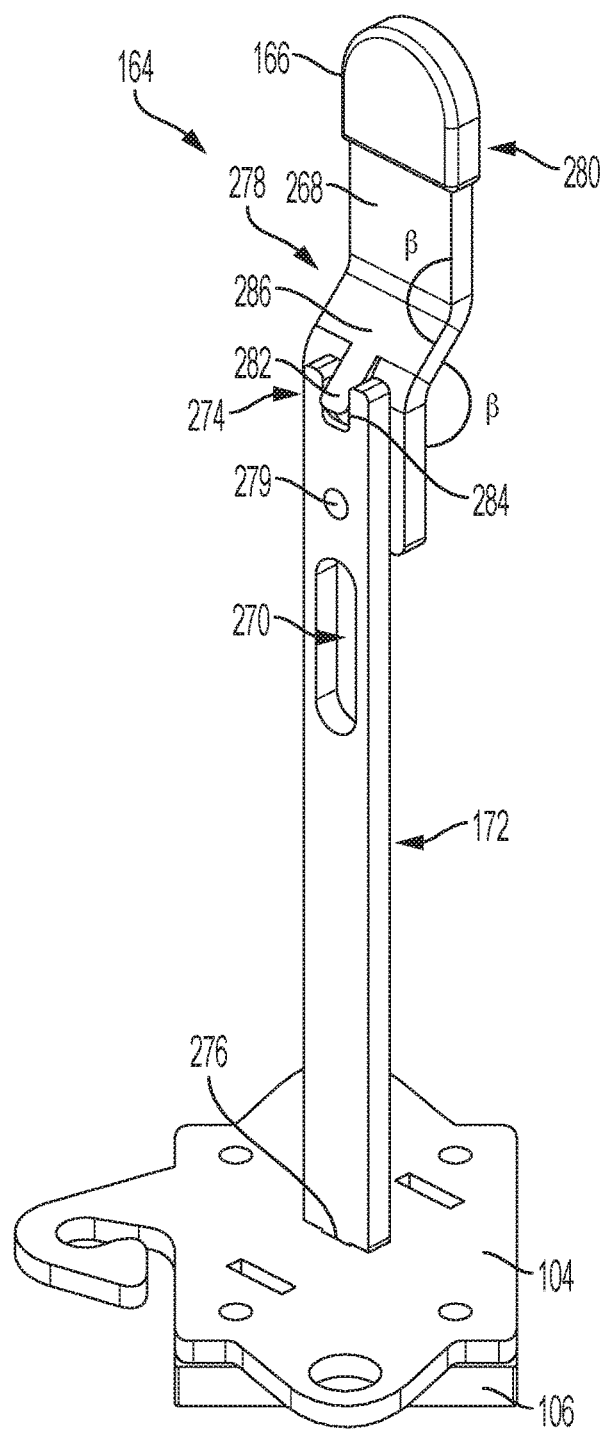
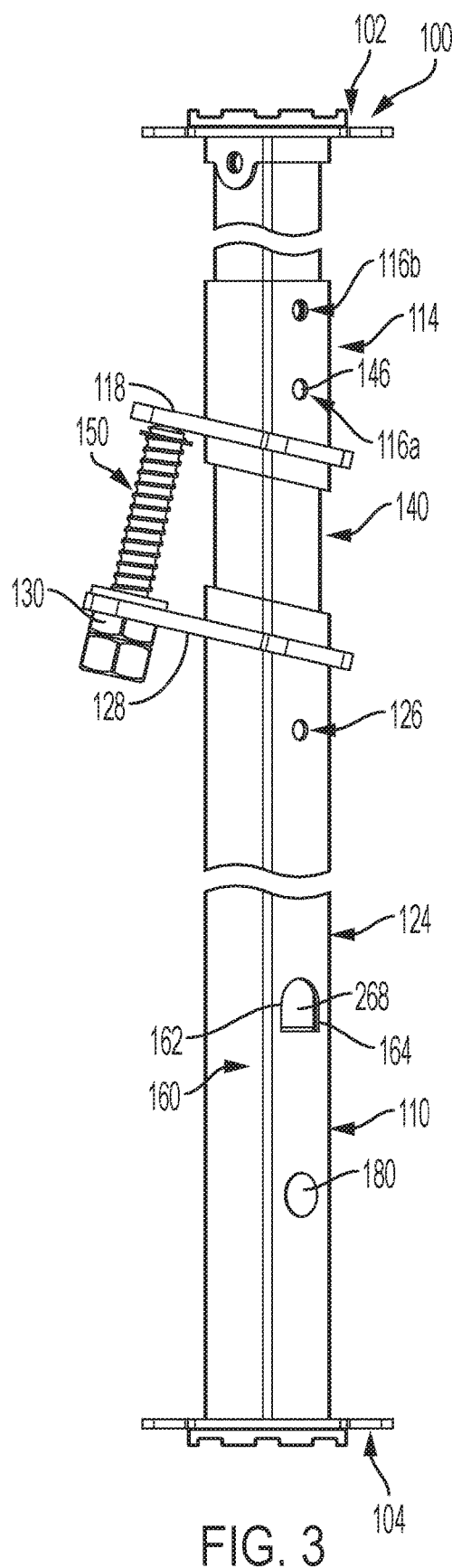
FIG. 2
FIG. 3

COMPRESSION POST WITH RETAINER CLIP

CROSS-REFERENCE TO RELATED APPLICATIONS

The present application is a continuation-in-part of U.S. application Ser. No. 16/510,499, filed Jul. 12, 2019, which is hereby specifically incorporated by reference herein in its entirety.

TECHNICAL FIELD

This disclosure relates to building construction. More specifically, this disclosure relates to a compression post comprising a retainer clip.

BACKGROUND

Compression posts are commonly used in building construction and can provide support for ceilings and/or elevated floors during construction, such as before proper support structures are built in place. Typically, a compression post extends between the floor and the ceiling of a single level of a building and can be compressed therebetween to hold the compression post in place, which prevents the compression post from being moved out of place by accidental contact with a worker or construction equipment, shifting of the building during construction, or even seismic events. Compression posts must be properly compressed to provide the necessary structural support; however, typical compression posts do not indicate to a user/installer whether the compression post is properly or improperly compressed. When the compression post is not properly compressed, it can be moved out of place. For example, a construction worker can accidentally run into the compression post, knocking the compression post out of position and potentially destabilizing the building, even causing the collapse of a portion or all of the building.

SUMMARY

It is to be understood that this summary is not an extensive overview of the disclosure. This summary is exemplary and not restrictive, and it is intended neither to identify key or critical elements of the disclosure nor delineate the scope thereof. The sole purpose of this summary is to explain and exemplify certain concepts off the disclosure as an introduction to the following complete and extensive detailed description.

Disclosed is an indicator for a compression post comprising a leg configured to engage a support plate of the compression post; and an indication portion supported by the leg and comprising: a first visual indicator configured to indicate that the compression post is in an uncompressed configuration; and a second visual indicator configured to indicate that the compression post is in a compressed configuration.

Also disclosed is a compression post for a building comprising a post outer shell defining a hollow interior and comprising a first section and a second section; an inner post slidably engaged with at least the second section of the post outer shell; and a visual indication system configured to indicate when the compression post is in a compressed configuration and an uncompressed configuration.

Also disclosed is a method for using a compression post, the method comprising providing a post outer shell and an inner post, the post outer shell comprising a first section and a second section, the inner post slidably engaged with at least the second section, wherein the compression post is in an uncompressed configuration; showing a first visual indicator of a visual indication system in the uncompressed configuration; moving the second section away from the first section to slide the second section along the inner post and to compress a spring and placing the compression post in a compressed configuration; and revealing a second visual indicator of the visual indication system in the compressed configuration.

A retainer clip for a compression post is disclosed, the retainer clip comprising a retainer body defining a first lateral body end, a second lateral body end opposite the first lateral end, a retainer opening formed through the retainer body and positioned between the first and second lateral body ends, and a retainer tab extending into the retainer opening; a biasing element positioner extending from the second lateral body end, the biasing element positioner comprising a positioner end wall, the positioner end wall defining an inner surface; and a biasing element engaging the inner surface of the biasing element positioner.

Also disclosed is a compression post for a building comprising a post outer shell; an inner post slidably engaged with the post outer shell, the inner post defining a plurality of retainer slots; and a retainer clip comprising a retainer tab, the retainer clip movable between an engaged configuration, wherein the retainer tab engages a one of the retainer slots, and a disengaged configuration, wherein the retainer tab is disengaged from each of the retainer slots.

A method of adjusting a length of a compression post is disclosed, the method comprising providing a compression post comprising an inner post and an post outer shell, the inner post slidably engaged with the post outer shell, the inner post defining a plurality of retainer slots; disengaging a retainer tab of a retainer clip from a one of the retainer slots; sliding the inner post relative to the post outer shell to adjust a length of the compression post to a desired length; and engaging the retainer tab with another one of the retainer slots to retain the inner post in position relative to the post outer shell at the desired length.

Various implementations described in the present disclosure may include additional systems, methods, features, and advantages, which may not necessarily be expressly disclosed herein but will be apparent to one of ordinary skill in the art upon examination of the following detailed description and accompanying drawings. It is intended that all such systems, methods, features, and advantages be included within the present disclosure and protected by the accompanying claims.

BRIEF DESCRIPTION OF THE DRAWINGS

The features and components of the following figures are illustrated to emphasize the general principles of the present disclosure. Corresponding features and components throughout the figures may be designated by matching reference characters for the sake of consistency and clarity.

FIG. 2 is a front view of an indicator of FIG. 1.

FIG. 3 is a front view of the compression post of FIG. 1 in a compressed configuration.

DETAILED DESCRIPTION

Figure 1:
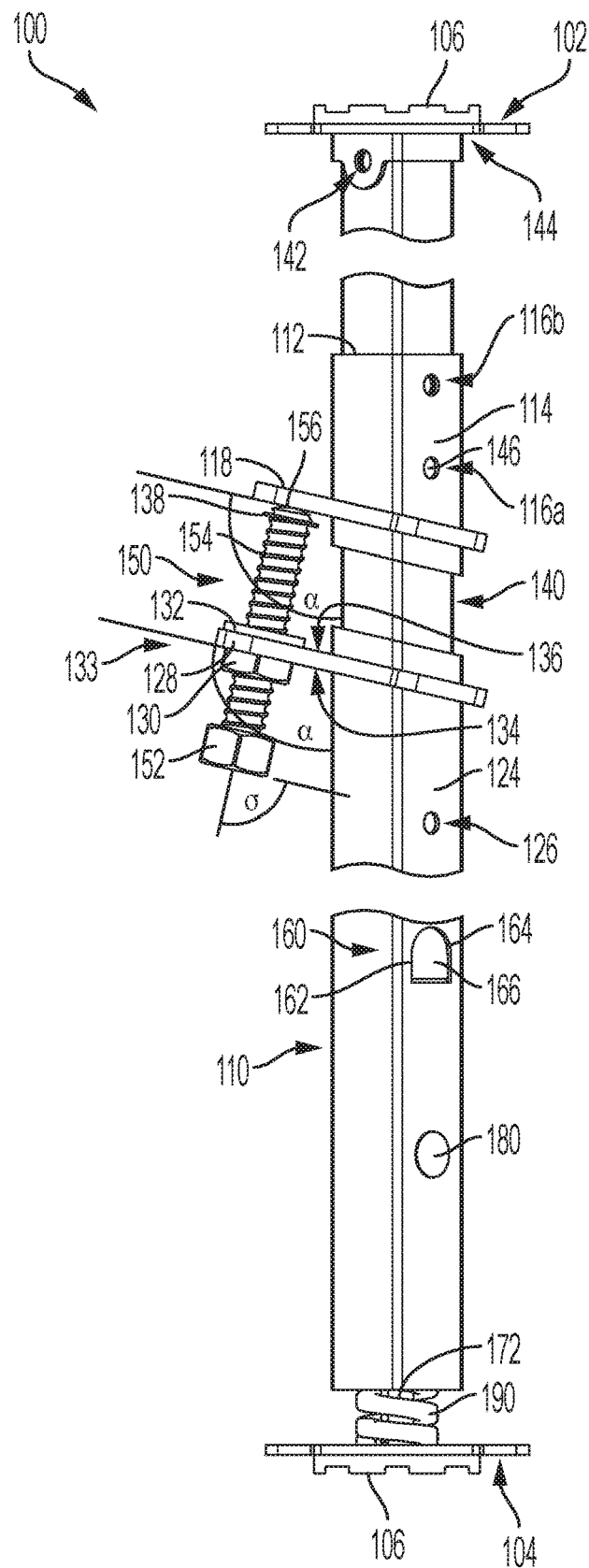
FIG. 1 is a front view of a compression post comprising an indicator, in accordance with one aspect of the present disclosure, wherein the compression post is in an uncompressed configuration.

The present disclosure can be understood more readily by reference to the following detailed description, examples, drawings, and claims, and the previous and following description. However, before the present devices, systems, and/or methods are disclosed and described, it is to be understood that this disclosure is not limited to the specific devices, systems, and/or methods disclosed unless otherwise specified, and, as such, can, of course, vary. It is also to be understood that the terminology used herein is for the purpose of describing particular aspects only and is not intended to be limiting.

The following description is provided as an enabling teaching of the present devices, systems, and/or methods in its best, currently known aspect. To this end, those skilled in the relevant art will recognize and appreciate that many changes can be made to the various aspects of the present devices, systems, and/or methods described herein, while still obtaining the beneficial results of the present disclosure. It will also be apparent that some of the desired benefits of the present disclosure can be obtained by selecting some of the features of the present disclosure without utilizing other features. Accordingly, those who work in the art will recognize that many modifications and adaptations to the present disclosure are possible and can even be desirable in certain circumstances and are a part of the present disclosure. Thus, the following description is provided as illustrative of the principles of the present disclosure and not in limitation thereof.

As used throughout, the singular forms "a," "an" and "the" include plural referents unless the context clearly dictates otherwise. Thus, for example, reference to "an element" can include two or more such elements unless the context indicates otherwise.

Ranges can be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

For purposes of the current disclosure, a material property or dimension measuring about X or substantially X on a particular measurement scale measures within a range between X plus an industry-standard upper tolerance for the specified measurement and X minus an industry-standard lower tolerance for the specified measurement. Because tolerances can vary between different materials, processes and between different models, the tolerance for a particular measurement of a particular component can fall within a range of tolerances.

As used herein, the terms "optional" or "optionally" mean that the subsequently described event or circumstance can or cannot occur, and that the description includes instances where said event or circumstance occurs and instances where it does not.

The word "or" as used herein means any one member of a particular list and also includes any combination of members of that list. Further, one should note that conditional language, such as, among others, "can," "could," "might," or "may," unless specifically stated otherwise, or otherwise understood within the context as used, is generally intended to convey that certain aspects include, while other aspects do not include, certain features, elements and/or steps. Thus, such conditional language is not generally intended to imply that features, elements and/or steps are in any way required for one or more particular aspects or that one or more particular aspects necessarily include logic for deciding, with or without user input or prompting, whether these features, elements and/or steps are included or are to be performed in any particular aspect.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutations of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific aspect or combination of aspects of the disclosed methods.

Disclosed in the present application is a compression post and associated methods, systems, devices, and various apparatus. Example aspects of the compression post can comprise a post outer shell and an inner post slidably received within at least a portion of the post outer shell. The compression post can further comprise a visual indication system for indicating when the compression post is properly compressed. It would be understood by one of skill in the art that the disclosed compression post is described in but a few exemplary aspects among many. No particular terminology or description should be considered limiting on the disclosure or the scope of any claims issuing therefrom.

FIG. 1 illustrates a first aspect of a compression post 100 according to the present disclosure. The compression post 100 can be positioned to extend between a ceiling and a floor of a building (not shown). As illustrated, the compression post 100 can comprise two support plates: a top plate 102 for engaging the ceiling and a bottom plate 104 for engaging the floor. The compression post 100 can also comprise a post outer shell 110 and an inner post 140, which together can extend between the top plate 102 and the bottom plate 104. In some aspects, each of the top plate 102 and bottom plate 104 can comprise a gripping pad 106 for improved grip strength with the ceiling and floor, respectively. The gripping pad 106 can be formed from a non-slip material, such as, for example, rubber. Example aspects of the post outer shell 110 can be substantially rectangular in shape and can define a hollow interior. The inner post 140 can also be substantially rectangular in shape and can be received within the hollow interior of the post outer shell 110. Each of the inner post 140 and post outer shell 110 can define a substantially square cross-sectional shape. However, in other aspects, the inner post 140 and post outer shell 110 can define any other suitable shape, such as cylindrical, and any other suitable cross-sectional shape, such as circular. Furthermore, example aspects of the inner post 140 and post outer shell 110 can be formed from a metal material, such as, for example, steel. In other aspects, the inner post 140 and post outer shell 110 can be formed from another metal material, such as aluminum, iron, a plastic material, or any other suitable material known in the art.

As shown, in example aspects, the inner post 140 can extend beyond a top end 112 of the post outer shell 110 and can engage the top plate 102. In some aspects, the inner post 140 can comprise a foot 142 at a top end 144 thereof, and the foot 142 can be pivotably coupled to the top plate 102. The pivotable connection between the foot 142 of the inner post 140 and the top plate 102 can accommodate for slight vertical misalignment of the compression post 100 or for non-parallel floors and ceilings, if present. Further, according to example aspects, the inner post 140 can be configured to slide within the post outer shell 110, or portions thereof. According to example aspects, the post outer shell 110 can define a first section, such as an upper section 114, and a second section, such as a lower section 124, that can be spaced from the upper section 114. The inner post 140 can extend through both of the upper and lower sections 114, 124, as shown. According to example aspects, the upper section 114 of the post outer shell 110 can define one or more upper holes 116 defined therethrough on both sides of the upper section 114. The lower section 124 of the post can also define one or more lower holes 126 defined therethrough on both sides of the lower section 124. In the present aspect, the upper and lower holes 116,126 can be spaced vertically along the upper section 114 and lower section 124, relative to the orientation shown.

In example aspects, a first bolt (not shown) can extend through one of the upper holes 116 and through a corresponding hole 146 through the inner post 140 to hold the upper section 114 in place relative to the inner post 140. In some aspects, multiple holes 146 can be defined through the inner post 140 to allow for the height of the compression post 100 to be adjusted. Specifically, the position of the inner post 140 relative to the upper section 114 can be selectively adjusted and a length of the compression post 100 can be selectively adjusted to accommodate varying distances between the floor and ceiling.

Similarly, a second bolt (not shown) can optionally extend through one of the lower holes 126 and can serve as a stop against a lower end (not shown) of the inner post 140. In some aspects, the first bolt or the second bolt can extend through one of the lower holes 126 and through another hole 146 in the inner post 140 in order to hold the lower section 114 in place relative to the inner post 140, such as for transportation of the compression post when not in use. Nuts can hold each of the bolts in place on the upper section 114 and the lower section 124, respectively. In some aspects, the bolts can be replaced with any other suitable device, such as a cotter pin, clevis pin, hitch pin, or a spring-loaded button mounted inside the inner post 140.

In example aspects, the upper section 114 can define an upper fastener ledge 118 extending therefrom and the lower section 124 can define a lower fastener ledge 128 extending therefrom. In the present aspect, the upper section 114 can extend through an upper ledge opening 418 (shown in FIG. 4) of the upper fastener ledge 118, and the lower section 124 can extend through a lower ledge opening 428 (shown in FIG. 4) of the lower fastener ledge 128. In some aspects, each of the upper and lower fastener ledges 118,128 can each be oriented at an obtuse angle $\alpha$ with respect to the post outer shell 110 and to a vertical direction. As such, the upper and lower fastener ledges 118,128 can be substantially parallel to one another. A fastener, such as a threaded bolt 150, as shown, can engage each of the upper fastener ledge 118 and lower fastener ledge 128. The threaded bolt 150 can define a bolt head 152 and a threaded tail 154 extending therefrom. In example aspects, the threaded tail 154 of the threaded bolt 150 can extend through an opening (not shown) in the lower fastener ledge 128 and a distal end 156 of the threaded tail 154 can abut the upper fastener ledge 118 distal from the bolt head 152. In the present aspect, a nut 130 and a washer 132 can be affixed to the lower fastener ledge 128, as shown, for example, by welding. The nut 130 and washer 132 be aligned with the opening, such that the nut 130, the opening, and the washer 132 can define an engagement assembly 133 through which the threaded tail 154 of the threaded bolt 150 can extend. In other aspects, the nut 130 and washer 132 can be affixed to the lower fastener ledge 128 by an adhesive or any other suitable fastener known in the art. According to example aspects, as shown, the nut 130 can be affixed to a lower surface 134 of the lower fastener ledge 128 and the washer 132 can be affixed to an upper surface 136 of the lower fastener ledge 128. Example aspects of the nut 130 can comprise threading configured to mate with the threading of the threaded bolt 150. Furthermore, as shown, example aspects of the threaded bolt 150 can comprise a snap ring 138 coupled thereto proximate the distal end 156 thereof, which can prevent the threaded bolt 150 from disengaging the engagement assembly 133, as described in further detail below.

The threaded bolt 150 can be loosened or tightened within the threaded nut 130 to move the upper section 114 and lower section 124 away from or towards one another, respectively. For example, when the threaded bolt 150 is tightened in the threaded nut 130, the distal end 156 of the threaded tail 154 can be pressed against the upper fastener ledge 118 to move the lower section 124 away from the upper section 114. On the other hand, when the threaded bolt 150 is loosened in the threaded nut 130, the threaded bolt 150 can move away from the upper fastener ledge 118, reducing the force applied to the spring 190 and allowing the spring 190 to bias the lower section 124 towards the upper section 114. According to example aspects, the snap ring 138 of the threaded bolt 150 can abut the washer 132 when the threaded bolt 150 is significantly loosened in order to prevent the threaded bolt 150 from disengaging the engagement assembly 133. The upper and lower fastener ledges 118,128 are oriented at the angle $\alpha$, as described above, and the threaded bolt 150 extends orthogonal to the ledges 118,128, which can cause the upper section 114 and lower section 124 to push laterally in opposite directions against the inner post 140 as the threaded bolt 150 is tightened and the upper and lower section 124 are pushed apart. These lateral forces increase friction forces between the sections 114,124 and the inner post 140 to further hold the inner post 140 in place relative to the post outer shell 110.

According to example aspects, the compression post 100 can be oriented in an uncompressed configuration, as shown in FIG. 1, and a compressed configuration, as shown in FIG. 3. Referring to FIG. 1, the compression post 100 can comprise a visual indication system 160 configured to indicate when the compression post 100 is fully in the compressed configuration. Example aspects of the visual indication system 160 can comprise a window 162 defined in the lower section 124 of the post outer shell 110 and an indicator 164 positioned within the hollow interior of the lower section 124 of the post outer shell 110 adjacent to the window 162. In one aspect, in the uncompressed configuration, a first visual indicator 166 of the indicator 164 can be visible through the window 162, and in the compressed configuration, a second visual indicator 268 (shown in FIG. 2) of the indicator 164 can be visible through the window 162. For example, in one particular aspect, the first visual indicator 166 can be a first color, such as red, and the second visual indicator 268 can be a second color, such as white, or can match the color of the post outer shell 110. In some aspects, the second visual indicator 268 can simply be a portion of the indicator 164 that is not the first visual indicator 166 and simply blends with the rest of the compression post 100. The visual appearance of the first visual indicator 166 can indicate that the compression post 100 is not fully compressed, while the visual appearance of the second visual indicator 268 can indicate that the compression post 100 is fully and properly compressed in the compressed configuration. In another aspect, the indicator 164 can include any suitable words, indicia, or any other markings to indicate that the compression post 100 is in either the compressed configuration or uncompressed configuration. Furthermore, in some other aspects, the indicator 164 can define additional visual indicators. For example, in one aspect, a third visual indicator (not shown) can be provided to indicate that the compression post is in a partially compressed configuration, in between the uncompressed configuration and the compressed configuration.

Example aspects of the compression post 100 can comprise a fastener, such as a bolt 180, for movably coupling the post outer shell 110 to the indicator 164 of the visual indication system 160. The bolt 180 can be fixedly secured to the post outer shell 110 through a hole (not shown) defined through the post outer shell 110. Example aspects of the bolt 180 can be slidably received within a slot 270 (shown in FIG. 2) of the indicator 164, such that the post outer shell 110 can slide relative to the indicator 164. According to example aspects, the inner post 140 can be configured to terminate within the lower section 124 at a location above the visual indication system 160, such that the inner post 140 does not interfere with the visual indication system 160. Furthermore, in example aspects, as shown, a spring 190 can extend between the bottom plate 104 of the compression post 100 and the bolt 180. The spring 190 can be a compression spring, for example, and can define a spring force. However, in other aspects, the spring 190 can be another type of spring. The spring 190 can wrap around a leg 172 of the indicator 164 as shown, and can extend between the bottom plate 104 and the bolt 180 received through the slot 270. In the uncompressed configuration of the compression post 100, as shown in FIG. 1, the spring force of the spring 190 can bias the bolt 180 upward within the slot 270 and away from the bottom plate 104. Because the bolt 180 can be fixedly secured to the post outer shell 110, the post outer shell 110 can consequently also be biased upward and away from the bottom plate 104. As such, the spring 190 can bias the compression post 100 to the uncompressed configuration.

Referring to FIG. 2, an example aspect of the indicator 164 is shown. Example aspects of the indicator can comprise a leg 172. The leg 172 can generally define an upper end 274 and a lower end 276, as shown. The lower end 276 of the leg 172 can be connected to or mounted on the bottom plate 104 of the compression post 100 (shown in FIG. 1). The leg 172 can extend generally upward from the bottom plate 104, relative to the orientation shown. According to example aspects, the slot 270 of the indicator 164 can be defined in the leg 172. In some aspects, the slot 270 can be oriented proximate the upper end of the leg 172, as shown; however, in other aspects, the slot 270 can be oriented at any other suitable location along the leg 172. Example aspects of the indicator 164 can further comprise an indicator bracket 277. The indicator bracket 277 can generally define a central portion 278 coupled to and extending generally upward from the upper end 274 of the leg 172, relative to the orientation shown, and an indication portion 280 distal from the leg 172. In the present aspect, the central portion 278 and the indication portion 280 can be monolithically formed; however, in other aspects, the central portion 278 and indication 280 can be separately formed and coupled together. According to example aspects, the central portion 278 can be attached to the leg 172 by a fastener 279, such as, for example, a bolt or screw. In some aspects, as shown, the central portion 278 can also comprise an arm 282 extending therefrom and configured to engage a notch 284 defined in the upper end 274 of the leg 172.

The indication portion 280 can comprise the first visual indicator 166 and the second visual indicator 268. In the present aspect, the second visual indicator 268, which, when visible through the window 162 can be indicative that the compression post 100 is in the compressed configuration, can be located on the indication portion 280 proximate to the central portion 278 of the indicator bracket 277. The first visual indicator 166, which, when visible through the window 162 can be indicative that the compression post 100 is not in compressed configuration, can be located on the indication portion 280 adjacent to the second visual indicator 168 and distal to the central portion 278. In some aspects, the indication portion 280 can be substantially parallel with the leg 172. Furthermore, as shown, some example aspects of the central portion 278 can define a bend 286. The bend 286 can extend between the leg 172 and the indication portion 280 at an $angle_R$ relative to each of the leg 172 and indication portion 280. As such, the indication portion 280 and the leg 172, while parallel to one another, can be vertically misaligned, relative to the orientation shown, which can push the indication portion 280 towards or against the window 162.

As described above, the spring force of the spring 190 (shown in FIG. 1) can bias the compression post 100 to the uncompressed configuration. Referring to FIG. 3, in the compressed configuration, the spring force can be overcome and the spring 190 (shown in FIG. 1) can be compressed. To move the compression post 100 from the uncompressed configuration to the compressed configuration, a force exceeding the spring force of the spring 190 must be applied to the spring 190. In the present aspect, to apply a force to the spring 190, the threaded bolt 150 of the compression post 100 can be rotated, such as with a drill or socket wrench, to push the threaded bolt 150 against the upper fastener ledge 118 and to move the lower section 124 of the post outer shell 110 away from the upper section 114 of the post outer shell 110. The lower section 124 of the post outer shell 110 can slide downward along the inner post 140, relative to the orientation shown. The first bolt can be engaged with one of the upper holes 116a,b of the upper section 114 and one of the holes 146 defined through the inner post 140, such that the inner post 140 can be fixed relative to the upper section 114 of the post outer shell 110. Thus, because the inner post 140 can be fixedly attached to the top plate 102 of the compression post 100, the inner post 140 and the upper section 114 of the post outer shell 110 can remain stationary as the lower section 124 moves downward, relative to the orientation shown, and away from the upper section 114.

As the lower section 124 moves away from the upper section 114, the lower section 124 can be moving towards the bottom plate 104 of the compression post 100. As such, the bolt 180 fixedly attached to the lower section 124 can slide downward, relative to the orientation shown, within the slot 270 (shown in FIG. 2) of the indicator 164 and can move towards the bottom plate 104. The spring 190 (shown in FIG. 1) can be sandwiched between the bolt 180 and the bottom plate 104, such that the spring 190 can be compressed as the bolt 180 moves towards the bottom plate 104. Furthermore, as the lower section 124 of the post outer shell 110 moves downward relative to the indicator 164, which can be fixedly connected to the bottom plate 104 by the leg 172 (shown in FIG. 1) of the indicator 164, the window 162 of the lower section 124 can also travel downward relative to the indicator 164. As such, the window 162 can move past the first visual indicator 166, which can be seen through the window 162 in the uncompressed configuration, and can move towards the second visual indicator 268. The threaded bolt 150 can be rotated to compress the spring 190 until the first visual indicator 166 is no longer visible and only the second visual indicator 268 is visible through the window 162, which can indicate that the compression post 100 is fully and properly compressed in the compressed configuration. For example, in one aspect, the compression force can be about 200 psi in the compressed configuration; however, in other aspects, the compression force can be any other suitable amount to properly compress the compression post 100 in the compressed configuration. Furthermore, as the spring 190 is compressed, the spring force of the spring 190 can resist the compression and can attempt to expand, applying a generally downward force against the bottom plate 104, relative to the orientation shown, and applying a generally upward force against the bolt 180, relative to the orientation shown, which can be transmitted to the top plate 102. As such, the compression post 100 can apply a force to both the floor and the ceiling of the building, fixing the compression post 100 in place to resist forces acting against it. It should be noted that, in other aspects of the compression post 100, the visual indication system 160 can be located at the upper section 114 of the compression post 100, as opposed the lower section 124. For example, the window 162 can be defined in the upper section 114 and the indicator 164 can be coupled to the top plate 102.

Figure 4:
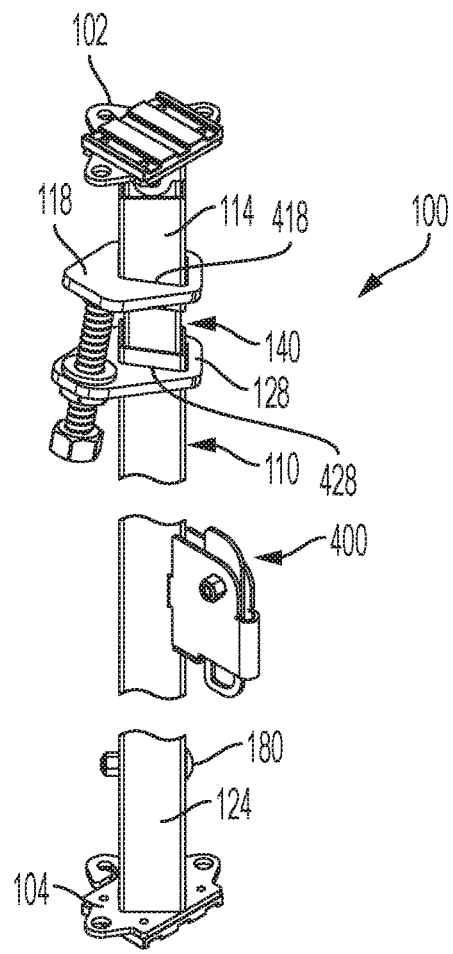
FIG. 4 is a top perspective view of the compression post of FIG. 1 in the compressed configuration.

Referring to FIG. 4, in some aspects, the compression post 100 can further comprise a bracket 400 coupled to the lower section 124 of the post outer shell 110. As shown, the bracket 400 can be coupled to the lower section 124 at a position above the window 162 (shown in FIG. 1). According to example aspects, the bracket 400 can be configured to engage a panel (not shown), such as, for example, a wire panel. The panel can be configured to support personnel (e.g., construction workers) above the floor of the building. In other aspects, the compression post 100 can include additional brackets 400 for supporting additional panels and/or the bracket 400 can be positioned at any other suitable location along the compression post 100. FIG. 4 also illustrates the upper ledge opening 418 formed through the upper fastener ledge 118 and the lower ledge opening 428 formed through the lower fastener ledge 128.

Figure 5:
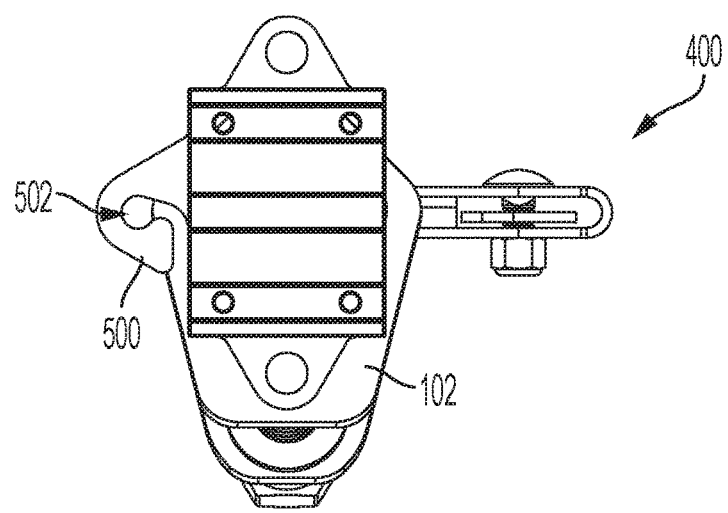
FIG. 5 is a top view of a top plate of the compression post of FIG. 1.

FIG. 5 illustrates a top view of the top plate 102. Example aspects of the top plate 102 can comprise a netting hook 500, as shown. The netting hook 500 can define an opening 502 between the netting hook 500 and the top plate 102. According to example aspects, the netting hook 500 can be configured to engage a safety netting (not shown) to support the safety netting above the floor of the building. For example, the safety netting can be a worker safety netting for protecting a worker in the event of a fall or can be a debris netting for capturing debris. In some aspects, the bottom plate 104 (shown in FIG. 1) can also comprise a netting hook 500 for engaging a safety netting.

Figure 6A:
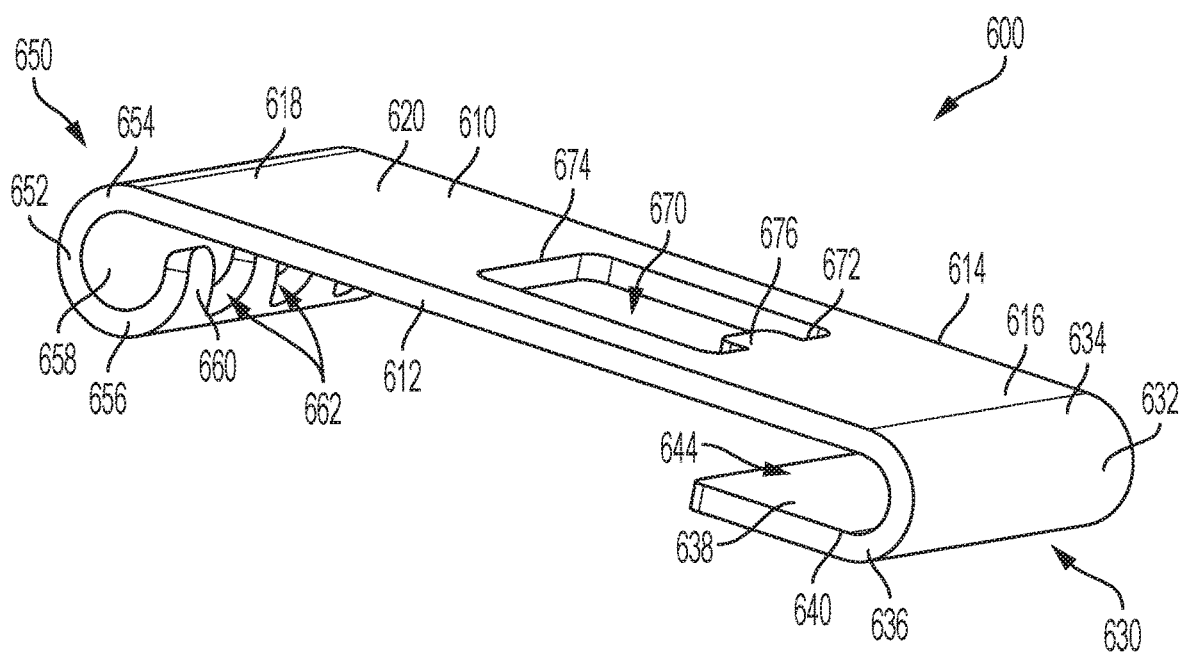
FIG. 6A is a top perspective view of a retainer clip, in accordance with another aspect of the present disclosure.

FIG. 6A illustrates a retainer clip 600 configured to hold the inner post 140 (shown in FIG. 1) in place relative to the lower section 124 (shown in FIG. 1) of the post outer shell 110 (shown in FIG. 1), according to another example aspect of the present disclosure. Example aspects of the retainer clip 600 can comprise a substantially planar retainer body 610. The retainer body 610 can generally define a first body end 612, an opposite second body end 614, a first lateral body end 616, and an opposite second lateral body end 618. The retainer body 610 can also define a body upper surface 620 and a body lower surface 822 (shown in FIG. 8). According to example aspects, the retainer clip 600 can further comprise a ledge grip 630 extending from the first lateral body end 616 and a biasing element positioner 650 extending from the second lateral body end 618 opposite the ledge grip 630. A retainer opening 670 can be formed through retainer body 610 and can define a first lateral opening end 672 and an opposite second lateral opening end 674. In example aspects, the retainer body 610 can define a retainer tab 676 extending laterally into the retainer opening 670 from the first lateral opening end 672 towards the second lateral opening end 674.

Figure 6B:
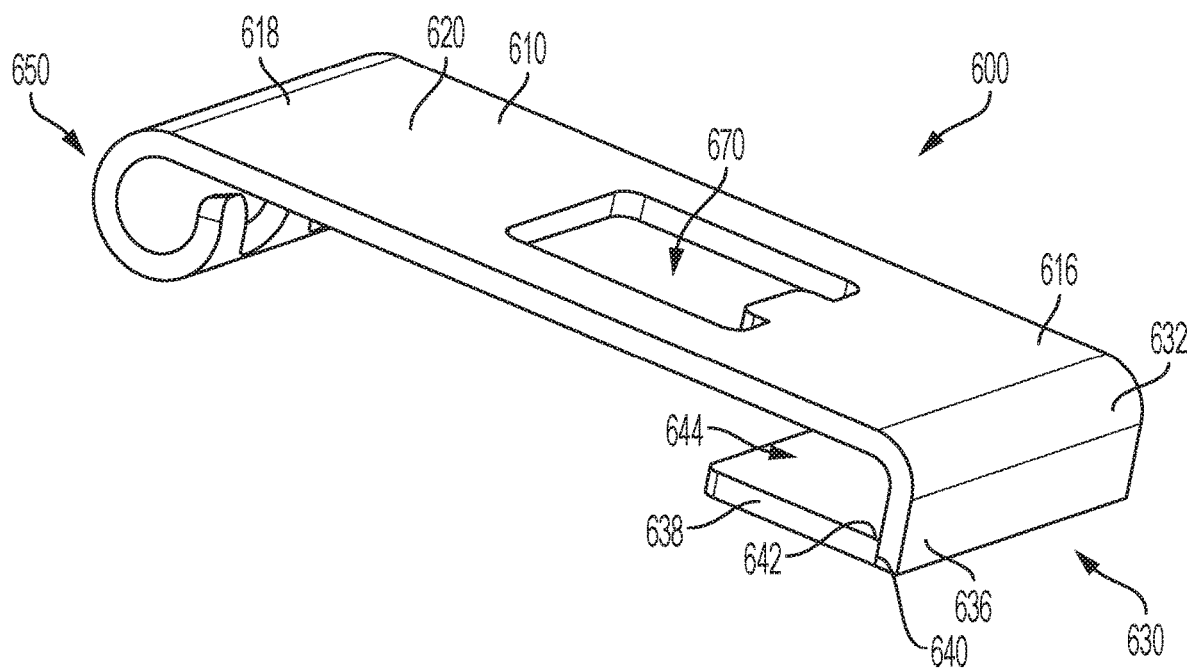
FIG. 6B is a top perspective view of the retainer clip according to another aspect of the present disclosure.

In example aspects, the ledge grip 630 can extend from the first lateral body end 616 of the retainer body 610. In some aspects, the ledge grip 630 can be substantially J-shaped, as shown. The J-shaped ledge grip 630 can define a first portion, which can be a generally curved portion 632 in the present aspect, and a second portion, which can be a generally planar portion 638 in the present aspect. The curved portion 632 can be substantially C-shaped in the present aspect and can define a proximal end 634 coupled to the retainer body 610 and a distal end 636 opposite the proximal end 634. The curved portion 632 can extend substantially downward from the retainer body 610, relative to the orientation shown, and the planar portion 638 of the ledge grip 630 can extend from the distal end 636 of the curved portion 632, such that the planar portion 638 can extend beneath the retainer body 610, relative to the orientation shown. In some aspects, a junction 640 between the curved portion 632 and the planar portion 638 can be substantially smooth and continuous, as shown in the present FIG. 6A; however, in other aspects, the junction 640 between the curved portion 632 and the planar portion 638 can define a sharp interior edge 642, as shown in FIG. 6B. Furthermore, in the present aspect, the planar portion 638 can be oriented substantially parallel with the retainer body 610, though in other aspects, the planar portion 638 and retainer body 610 may not be parallel. As shown, a ledge slot 644 can be defined between the retainer body 610 and the ledge grip 630, which can be configured to receive a portion of the upper fastener ledge 118 (shown in FIG. 1), as described in further detail below.

According to example aspects, the biasing element positioner 650 can extend from the second lateral body end 618 of the retainer body 610. The biasing element positioner 650 can define a positioner end wall 652, which can be curved in the present aspect, and a plurality of positioner tines 660 extending therefrom. The curved positioner end wall 652 can be substantially C-shaped in the present aspect and can define proximal end 654 coupled to the retainer body 610 and a distal end 656 opposite the proximal end 654. The curved positioner end wall 652 can extend substantially downward from the retainer body 610, relative to the orientation shown, and can curve towards the ledge grip 630. Example aspects of the positioner tines 660 of the biasing element positioner 650 can extend substantially upward from the distal end 656 of the curved positioner end wall 652, relative towards the orientation shown, towards the retainer body 610. A positioner slot 662 can be defined between each adjacent pair of positioner tines 660, as shown. A biasing element 850 (shown in FIG. 8), such as a spring 855 (shown in FIG. 8) can extend through one of the positioner slots 662 to engage an inner surface 658 of the curved positioner end wall 652, as described in further detail below.

As shown, according to example aspects, the retainer opening 670 can extend fully through the retainer body 610 from the body upper surface 620 to the body lower surface 822. The retainer opening 670 can be sized and shaped to receive the inner post 140 therethrough. In the present aspect, the retainer opening 670 can be elongated in the lateral direction, such that the retainer opening 670 can generally define a rectangular shape. In other aspects, the retainer opening 670 can be any other suitable shape. As shown, the retainer tab 676 can extend into the retainer opening 670 from the first lateral opening end 672 substantially in the lateral direction towards the second lateral opening end 674. In the present aspect, the retainer tab 676 can be sized and shaped to engage one or more retainer slots 742 (shown in FIG. 7) of the inner post 140, as described in further detail below.

Figure 7:
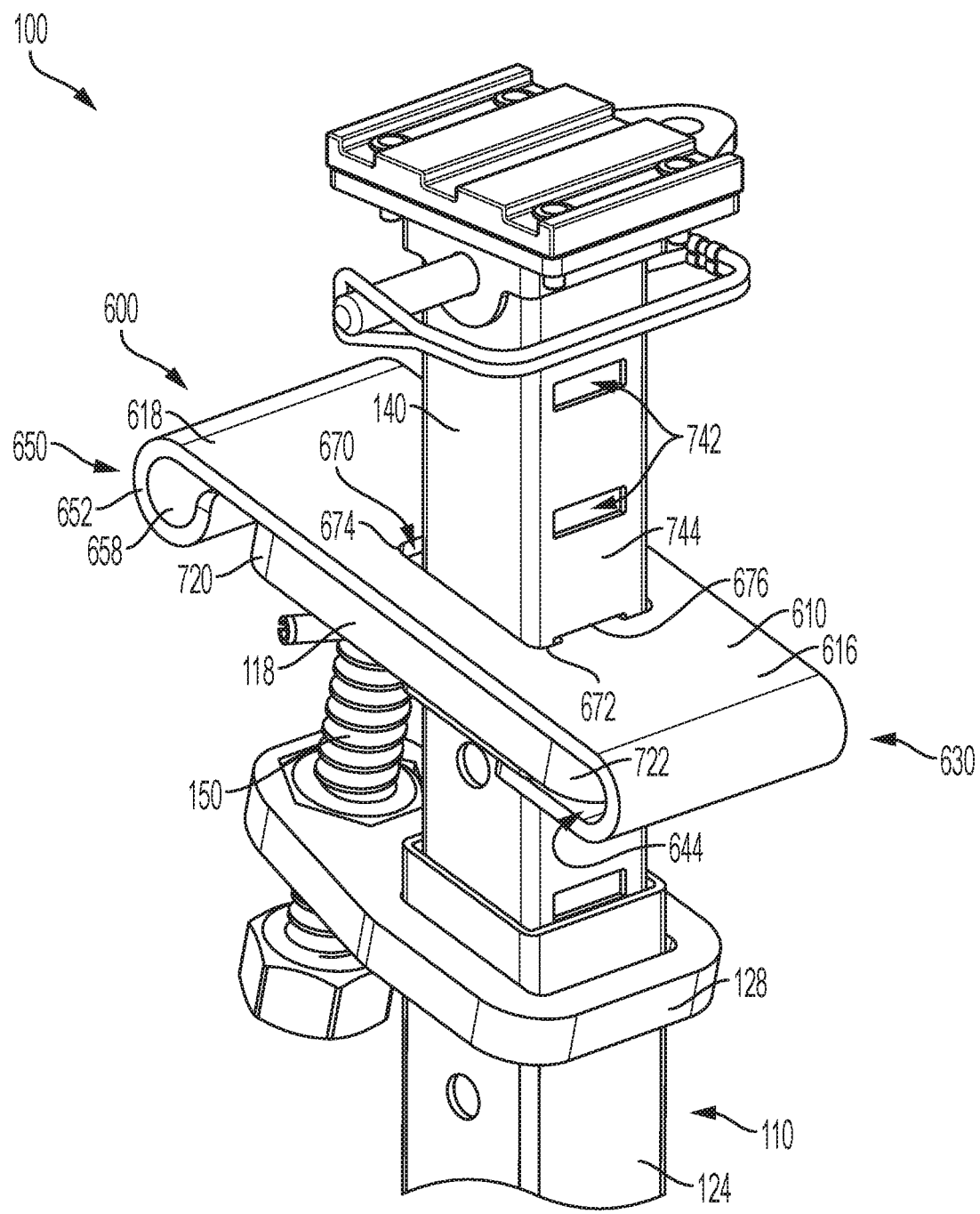
FIG. 7 is a top perspective view of the retainer clip of FIG. 6 assembled with the compression post, in accordance with another aspect of the present disclosure, wherein the retainer clip is in an engaged configuration.
Figure 10:
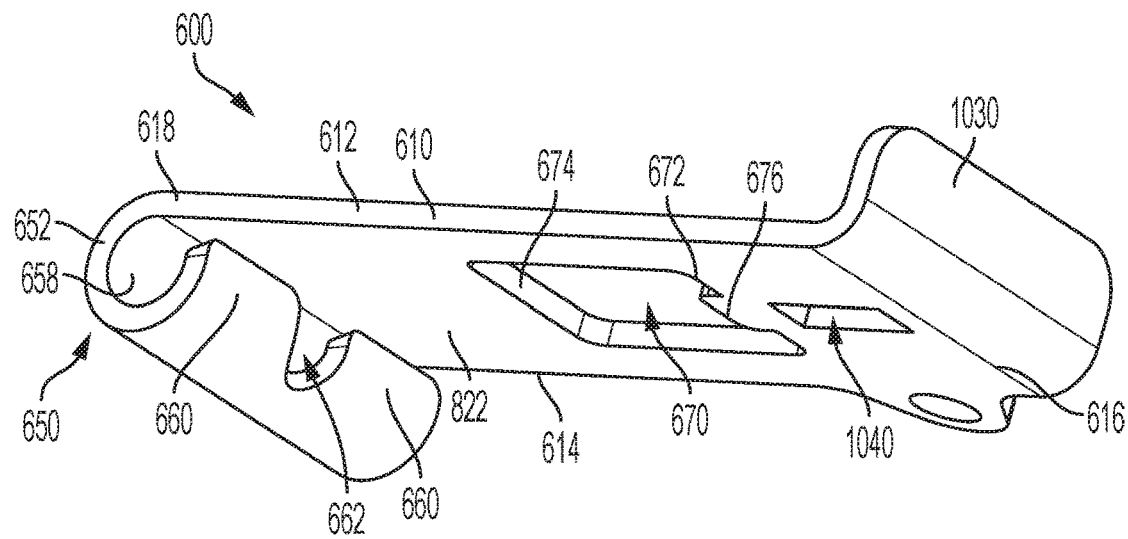
FIG. 10 is a bottom perspective view of the retainer clip, in accordance with another aspect of the present disclosure.

FIG. 7 illustrates the compression post 100 comprising the retainer clip 600, according to another aspect of the present invention. In example aspects, the retainer clip 600 can be slidably mounted on the upper fastener ledge 118. As depicted, in some aspects, the compression post 100 may not comprise the upper section 114 (shown in FIG. 1) of the post outer shell 110. As such, the upper fastener ledge 118 is not coupled to the upper section 114 in the present aspect. Rather, the threaded bolt 150 can press generally upward against the upper fastener ledge 118 adjacent to a proximal lateral end 720 thereof, relative to the orientation shown, to bias the upper fastener ledge 118 against the body lower surface 822 (shown in FIG. 8) of the retainer clip 600, thereby securing the upper fastener ledge 118 to the retainer clip 600. Furthermore, a distal lateral end 722 of the upper fastener ledge 118 can be retained within the ledge slot 644 of the retainer clip 600, further securing the upper fastener ledge 118 to the retainer clip 600. The upper fastener ledge 118 can thus be secured to the retainer clip 600 at or near each of the proximal lateral end 720 and distal lateral end 722 thereof. Example aspects of the retainer clip 600 can be oriented in an engaged configuration, as shown in FIGS. 8 and 10, wherein the retainer clip 600 is secured to the inner post 140, and a disengaged configuration, as shown in FIG. 8, wherein the retainer clip 600 is disengaged from and movable relative to the inner post 140.

According to example aspects, the inner post 140 can extend through the upper ledge opening 418 (shown in FIG. 4) formed through the upper fastener ledge 118 and through the retainer opening 670 of the retainer clip 600. Example aspects of the inner post 140 can define a plurality of the retainer slots 742 formed along a length of inner post 140 or a portion thereof. The retainer slots 742 can be equally spaced from one another, as shown, and can be formed along a first side 744 of the inner post 140, which can face towards the retainer tab 676 of the retainer clip 600. In other aspects, the retainer slots 742 may not be equally spaced. In the engaged configuration, as illustrated, the retainer tab 676 can be configured to extend into a corresponding one of the retainer slots 742 to secure the retainer clip 600 to the inner post 140 and to retain the inner post 140 in place relative to the lower section 124 of the post outer shell 110. In some aspects, the retainer clip 600 can be biased to the engaged configuration by the biasing element 850 (shown in FIG. 8). In the present aspect, the retainer opening 670 can be elongated such that a clearance can be provided between the second lateral opening end 674 thereof and the inner post 140 in the engaged configuration, which can allow the retainer clip 600 to slide laterally relative to the inner post 140. To move the retainer clip 600 to the disengaged configuration, the retainer clip 600 can be slid laterally relative to the inner post 140 to reduce the clearance between the inner post 140 and the second lateral opening end 674 of the retainer opening 670 and to disengage the retainer tab 676 from the corresponding retainer slot 742.

Figure 8:
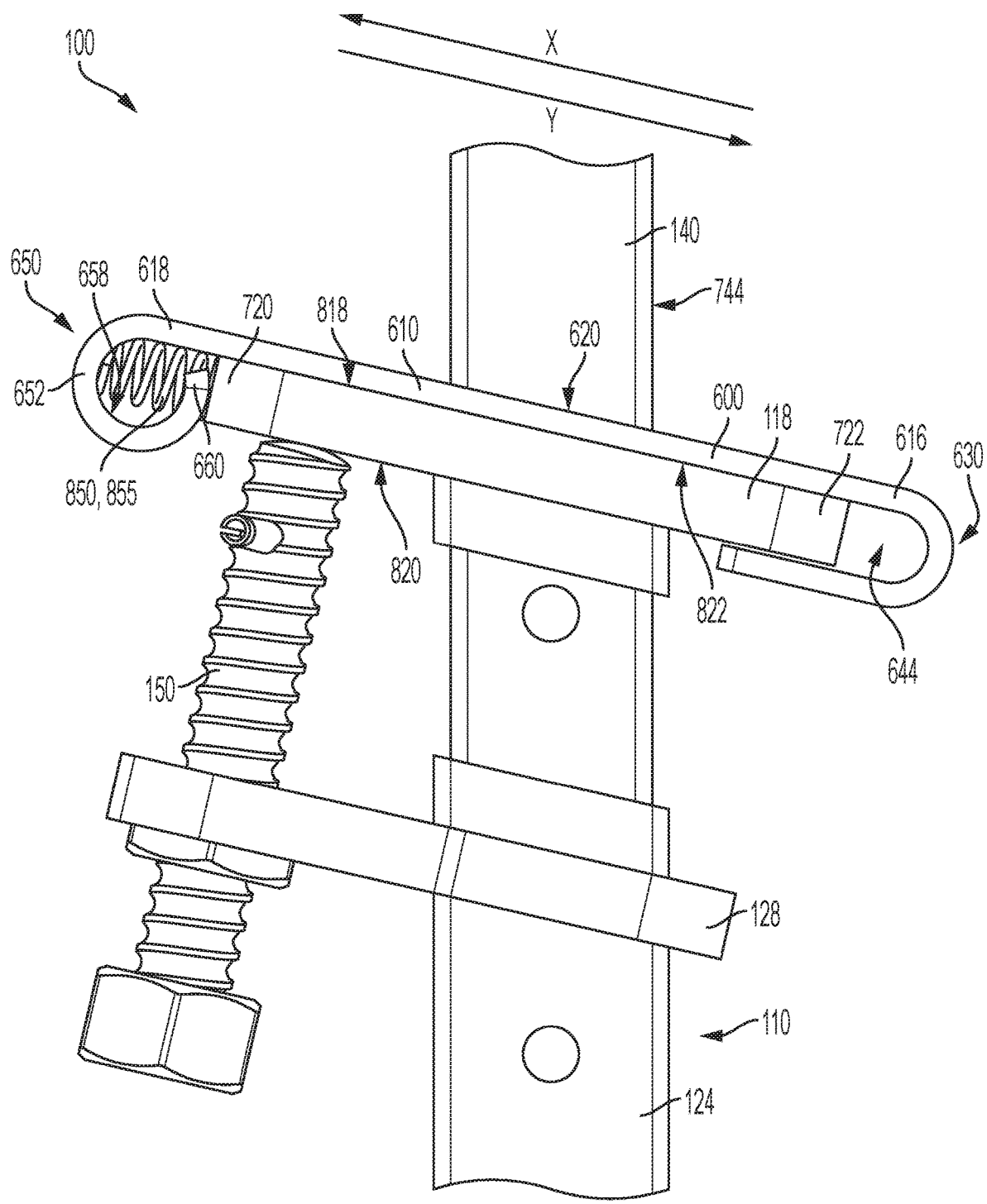
FIG. 8 is a front view of the retainer clip of FIG. 6A assembled with the compression post of FIG. 8, wherein the retainer clip is in a disengaged configuration.

FIG. 8 illustrates the retainer clip 600 in the disengaged configuration. According to example aspects, the biasing element 850 can be provided to bias the retainer clip 600 to the engaged configuration. The biasing element 850 can be, for example, the spring 855, as shown, or any other suitable biasing element 850 known in the art. In the present aspect, the spring 855 can extend between the proximal lateral end 720 of the upper fastener ledge 118 and the inner surface 658 of the curved positioner end wall 652 of the biasing element positioner 650, and can bias the biasing element positioner 650 away from the proximal lateral end 720, generally in the direction X. The spring 855 can also extend through a corresponding one of the positioner slots 662 (shown in FIG. 6A) of the biasing element positioner 650, and the adjacent positioner tines 660 can retain the spring 855 in position between the upper fastener ledge 118 and the positioner end wall 652. As the biasing element positioner 650 is biased away from the proximal lateral end 720 of the upper fastener ledge 118, the retainer tab 676 (shown in FIG. 6A) can be biased towards the inner post 140 to engage one of the retainer slots 742 (shown in FIG. 7).

To move the retainer clip 600 to the disengaged configuration, as shown, a force can be applied to the retainer clip 600 to overcome a spring force of the spring 855 and to slide the body lower surface 822 of the retainer clip 600 along an upper ledge surface 818 of the upper fastener ledge 118, generally in the direction Y, which can be substantially opposite the direction X. As the retainer clip 600 is slid in the direction Y, the spring 855 can be compressed between the biasing element positioner 650 and the upper fastener ledge 118. As described above, the clearance defined between the inner post 140 and the second lateral opening end 674 (shown in FIG. 6A) of the retainer opening 670 (shown in FIG. 6A) can allow for movement of the retainer clip 600 relative to the inner post 140 in the direction Y. As the retainer clip 600 slides in the direction Y, the retainer tab 676 can be withdrawn from the corresponding retainer slot 742 of the inner post 140. As shown, in some aspects, a portion of the upper fastener ledge 118 may be withdrawn from the ledge slot 644 of the ledge grip 630 when the retainer clip 600 is in the disengaged configuration, but the distal lateral end 722 of the upper fastener ledge 118 can remain engaged therewith.

As shown, the threaded bolt 150 can abut a lower ledge surface 820 of the upper fastener ledge 118. The engagement of the threaded bolt 150 with the lower ledge surface 820 of the upper fastener ledge 118 can maintain the position of the upper fastener ledge 118 and the retainer clip 600 with respect to the lower section 124 of the post outer shell 110. However, with the retainer tab 676 withdrawn from the retainer slot 742 of the inner post 140, the position of the retainer clip 600 and the upper fastener ledge 118 along the length of the inner post 140 can be adjusted as desired. As described above, the inner post 140 can slidably engage the lower section 124 of the post outer shell 110, and the inner post 140 can be slid in a substantially upward or downward direction, relative to the orientation shown, to move the inner post 140 further into or out of the lower section 124, thereby adjusting the length of the compression post 100 to a desired length. As such, in example aspects, the position of the retainer clip 600 and upper fastener ledge 118 along the length of the inner post 140 can be adjusted by sliding the inner post 140 relative to the lower section 124 of the post outer shell 110.

According to various example aspects, the position of the inner post 140 relative to the lower section 124 of the post outer shell 110 can also be adjusted while the retainer clip 600 remains in the engaged configuration (i.e., the retainer tab 676 remains within a corresponding retainer slot 742). For example, in the present aspect, the threaded bolt 150 can be selectively tightened or loosened relative to the lower fastener ledge 128, which can increasingly push the threaded bolt 150 against or retract the threaded bolt 150 away from the upper fastener ledge 118, respectively. Pushing the threaded bolt 150 against the upper fastener ledge 118 can bias the upper fastener ledge 118 and the retainer clip 600 upward, relative to the orientation shown, away from the lower section 124. Because the retainer clip 600 is in the engaged configuration, wherein the retainer tab 676 can be engaged with a corresponding one of the retainer slots 742, the inner post 140 can slide upward with the retainer clip 600 further out of the lower section 124, thereby lengthening the compression post 100. Conversely, retracting the threaded bolt 150 away from the upper fastener ledge 118 can allow the upper fastener ledge 118 and the retainer clip 600 to move downward, relative to the orientation shown, towards the lower section 124. Again, because the retainer tab 676 is engaged with a corresponding retainer slot 742, the inner post 140 can slide downward with the retainer clip 600 further into the lower section 124, thereby shortening the compression post 100.

Figure 9:
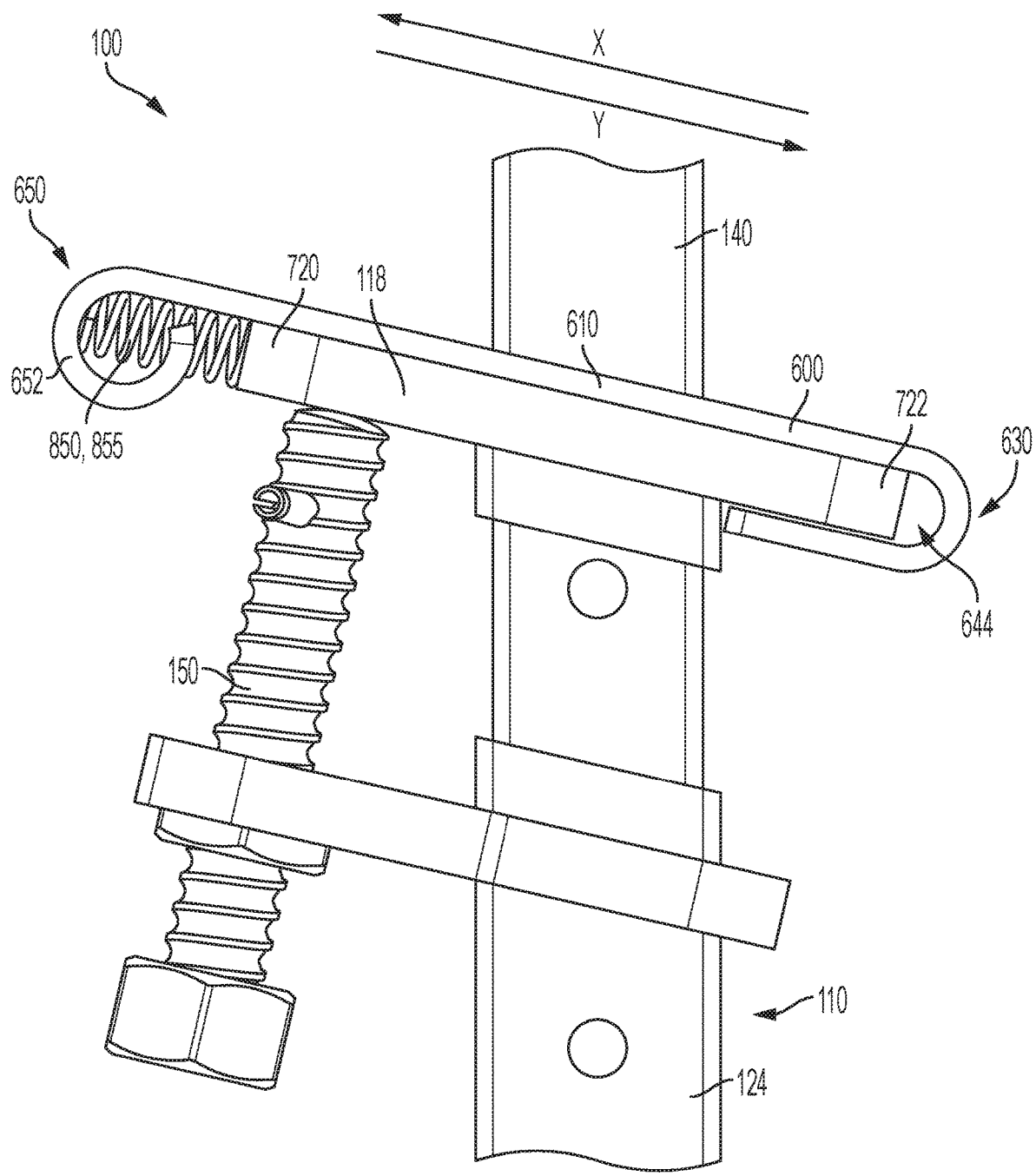
FIG. 9 is a front view of the retainer clip of FIG. 6A assembled with the compression post of FIG. 8, wherein the retainer clip is in the engaged configuration.

Referring to FIG. 9, once the inner post 140 is oriented in a desired position relative to the lower section 124 of the post outer shell 110, the retainer clip 600 can be returned to the engaged configuration, as shown, to secure the inner post 140 in the new position, thus securing the compression post 100 at the desired length. To return the retainer clip 600 to the engaged configuration, the force applied to the retainer clip 600 can be released and the spring 855 can bias the retainer clip 600 back in the direction X. The retainer tab 676 (shown in FIG. 6A) can be aligned with a corresponding one of the retainer slots 742 (shown in FIG. 7) along the length of the inner post 140, and as the retainer clip 600 slides along the upper fastener ledge 118 in the direction X, the retainer tab 676 can engage the corresponding retainer slot 742 to retain the retainer clip 600 and upper fastener ledge 118 in position relative to the inner post 140. Thus, the inner post 140 can be retained in position relative to the lower section 124 of the post outer shell 110. In some aspects, in addition to adjusting the length of the compression post 100, the engagement of the retainer tab 676 with a one of the retainer slots 742 can serve to retain the compression post 100 in an assembled configuration during transportation and/or installation by preventing the inner post 140 from sliding out of the post outer shell 110.

FIG. 10 illustrates the retainer clip 600 according to another aspect of the present disclosure. Various features of the present retainer clip 600 can be similar to the retainer clips 600 of FIGS. 6A and 6B. For example, the retainer clip 600 can comprise the retainer body 610, which can define the first body end 612, second body end 614, first lateral body end 616, and second lateral body end 618. The retainer body 610 can also define the body upper surface 620 (shown in FIG. 11) and the body lower surface 822. The retainer opening 670 can be formed through retainer body 610 and can define the first lateral opening end 672 and second lateral opening end 674. The retainer tab 676 can extend laterally into the retainer opening 670 from the first lateral opening end 672 towards the second lateral opening end 674. Additionally, the biasing element positioner 650 extending from the second lateral body end 618. In the present aspect, the biasing element positioner 650 can define a pair of the positioner tines 660 and a single one of the positioner slots 662 oriented centrally therebetween. The biasing element 850 (shown in FIG. 11), such as the spring 855 (shown in FIG. 11), can extend through the positioner slot 662 to engage the inner surface 658 curved positioner end wall 652.

In the present aspect, the retainer clip 600 does not comprise the ledge grip 630; rather, according to example aspects, the retainer clip 600 can define a shoulder 1030 extending from the first lateral body end 616 substantially in an upward direction, relative to the orientation shown. The retainer clip 600 can further define a first fastener slot 1040 formed through the retainer body 610 proximate to the first lateral body end 616 and configured to receive a fastener 1150 (shown in FIG. 11) therethrough for securing the retainer clip 600 to the upper fastener ledge 118 (shown in FIG. 11). In the present aspect, the first fastener slot 1040 can be oriented between the retainer opening 670 and the shoulder 1030, as shown.

Figure 11:
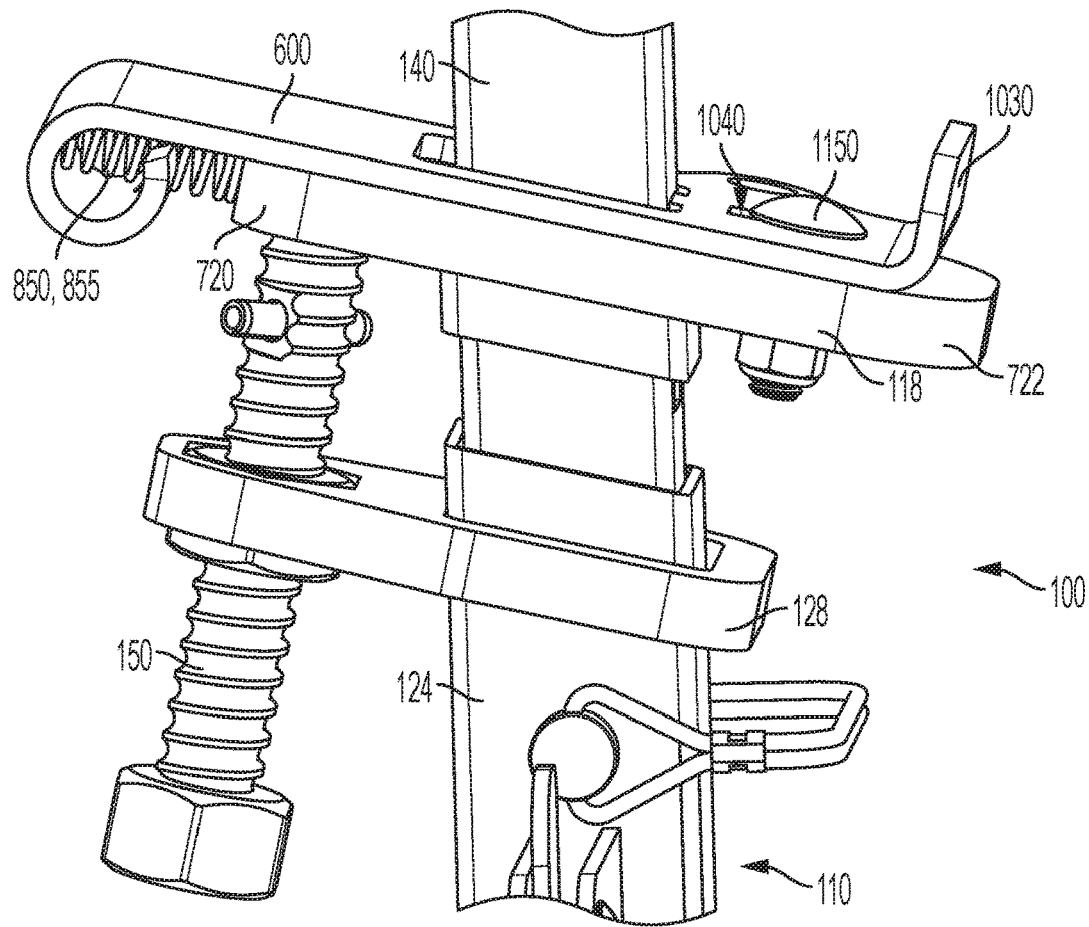
FIG. 11 is a top perspective view of the retainer clip of FIG. 10 assembled with the compression post of FIG. 7, wherein the retainer clip is in the engaged configuration.

FIG. 11 illustrates the compression post 100 comprising the retainer clip 600 of FIG. 10. As shown, the shoulder 1030 can extend substantially upward and away from the upper fastener ledge 118. The fastener 1150 can extend through the first fastener slot 1040 of the retainer clip 600 and can engage the upper fastener ledge 118 to secure the retainer clip 600 to the upper fastener ledge 118 proximate to the distal lateral end 722 of the upper fastener ledge 118. According to example aspects, the first fastener slot 1040 can be sized such that the fastener 1150 can slide within the first fastener slot 1040 as the retainer clip 600 moves between the engaged and disengaged configurations.

One should note that conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more particular embodiments or that one or more particular embodiments necessarily include logic for deciding, with or without user input or prompting, whether these features, elements and/or steps are included or are to be performed in any particular embodiment.

It should be emphasized that the above-described embodiments are merely possible examples of implementations, merely set forth for a clear understanding of the principles of the present disclosure. Any process descriptions or blocks in flow diagrams should be understood as representing modules, segments, or portions of code which include one or more executable instructions for implementing specific logical functions or steps in the process, and alternate implementations are included in which functions may not be included or executed at all, may be executed out of order from that shown or discussed, including substantially concurrently or in reverse order, depending on the functionality involved, as would be understood by those reasonably skilled in the art of the present disclosure. Many variations and modifications may be made to the above-described embodiment(s) without departing substantially from the spirit and principles of the present disclosure. Further, the scope of the present disclosure is intended to cover any and all combinations and sub-combinations of all elements, features, and aspects discussed above. All such modifications and variations are intended to be included herein within the scope of the present disclosure, and all possible claims to individual aspects or combinations of elements or steps are intended to be supported by the present disclosure.

That which is claimed is:

1. A retainer clip for a compression post comprising:
a planar retainer body defining a first lateral body end, a second lateral body end opposite the first lateral end, and a retainer opening formed through the retainer body and positioned between the first and second lateral body ends, the planar retainer body further defining and a retainer tab integrally formed with the planar retainer body and extending laterally into the retainer opening;
a biasing element positioner integrally formed with the planar retainer body and extending from the second lateral body end, the biasing element positioner comprising a positioner end wall, the positioner end wall defining an inner surface; and
a biasing element engaging the inner surface of the biasing element positioner.

2. The retainer clip of claim 1, further comprising a ledge grip extending from the first lateral body end, the ledge grip defining a ledge slot, wherein at least a portion of the ledge grip extends beneath the planar retainer body.

3. The retainer clip of claim 2, wherein the ledge grip defines a first portion and a second portion, the first portion defining a proximal end coupled to the planar retainer body and a distal end opposite the proximal end, the first portion extending substantially downward from the planar retainer body, the second portion extending from the distal end of the first portion, wherein the second portion is oriented substantially parallel to the planar retainer body.

4. The retainer clip of claim 1, further comprising a shoulder extending from the first lateral body end.

5. The retainer clip of claim 1, further defining a fastener slot extending through the planar retainer body, the fastener slot oriented between the retainer opening and the first lateral body end.

6. The retainer clip of claim 1, wherein:
the biasing element positioner defines a pair of positioner tines extending from the positioner end wall;
a positioner slot is defining between the pair of positioner tines; and
the biasing element extends through the positioner slot.

7. The retainer clip of claim 6, wherein the positioner end wall extends substantially downward from the planar retainer body and the pair of positioner tines extend substantially upward from the positioner end wall toward the planar retainer body.

8. A compression post for a building comprising:
a post outer shell;
an inner post slidably engaged with the post outer shell, the inner post defining a plurality of retainer slots; and
a retainer clip comprising a planar retainer body, the planar retainer body defining a retainer opening and a retainer tab extending laterally into the retainer opening, the retainer tab integrally formed with the planar retainer body, the retainer clip movable between an engaged configuration, wherein the retainer tab engages a one of the retainer slots, and a disengaged configuration, wherein the retainer tab is disengaged from each of the retainer slots.

9. The compression post of claim 8, wherein
the inner post extends through the retainer opening.

10. The compression post of claim 8, wherein the retainer clip further comprises a biasing element biasing the retainer clip to the engaged configuration.

11. The compression post of claim 10, wherein the compression post further comprises an upper fastener ledge defining a proximal lateral end and a distal lateral end, the retainer clip slidably mounted on the upper fastener ledge.

12. The compression post of claim 11, wherein the retainer clip comprises a biasing element positioner extending from the planar retainer body, the biasing element extending between the proximal lateral end of the upper fastener ledge and the biasing element positioner.

13. The compression post of claim 12, wherein the biasing element positioner comprises a positioner end wall, a pair of positioner tines extending from the positioner end wall, and a positioner slot defined between the pair of positioner tines, the positioner end wall defining an inner surface, the biasing element extending through the positioner slot and engaging the inner surface of the positioner end wall.

14. The compression post of claim 12, wherein the retainer clip further comprises a ledge grip extending from the planar retainer body opposite the biasing element positioner, the ledge grip defining a ledge slot, the distal lateral end of the upper fastener ledge received in the ledge slot.

15. The compression post of claim 12, wherein:
the retainer clip further defines a fastener slot formed through the planar retainer body;
the compression post further comprises a fastener extending through the fastener slot and engaging the upper fastener ledge to secure the retainer clip to the upper fastener ledge; and
the fastener is configured to slide within the fastener slot as the retainer clip moves between the engaged configuration and the disengaged configuration.

16. The compression post of claim 11, further comprising a lower fastener ledge and a fastener, the lower fastener ledge mounted to the post outer shell, the fastener extending through the lower fastener ledge and abutting a lower ledge surface of the upper fastener ledge.

17. A method of adjusting a length of a compression post comprising:
- providing a compression post comprising an inner post and an post outer shell, the inner post slidably engaged with the post outer shell, the inner post defining a plurality of retainer slots;
- disengaging a retainer tab of a retainer clip from a one of the retainer slots, which comprises sliding the retainer clip along an upper fastener ledge from an engaged configuration to a disengaged configuration;
- sliding the inner post relative to the post outer shell to adjust a length of the compression post to a desired length; and
- engaging the retainer tab with another one of the retainer slots to retain the inner post in position relative to the post outer shell at the desired length, wherein a biasing element biases the retainer clip to the engaged configuration.

18. The method of claim 17, wherein the retainer clip comprises a retainer body and a biasing element positioner extending from the retainer body, and wherein the biasing element extends between a proximal lateral end of the upper fastener ledge and the biasing element positioner.

19. The method of claim 17, wherein:
- the compression post further comprises a lower fastener ledge mounted to the post outer shell;
- a fastener extends through the lower fastener ledge and abuts an upper fastener ledge;
- the retainer clip is mounted on the upper fastener ledge; and
- the method further comprises one of tightening and loosening the fastener relative to the lower fastener ledge to further adjust the length of the compression post.

* * * * *